(No Model.) 5 Sheets—Sheet 3.
G. HANSON & C. D. CLARK.
SAW MILL SET WORKS.
No. 326,291. Patented Sept. 15, 1885.
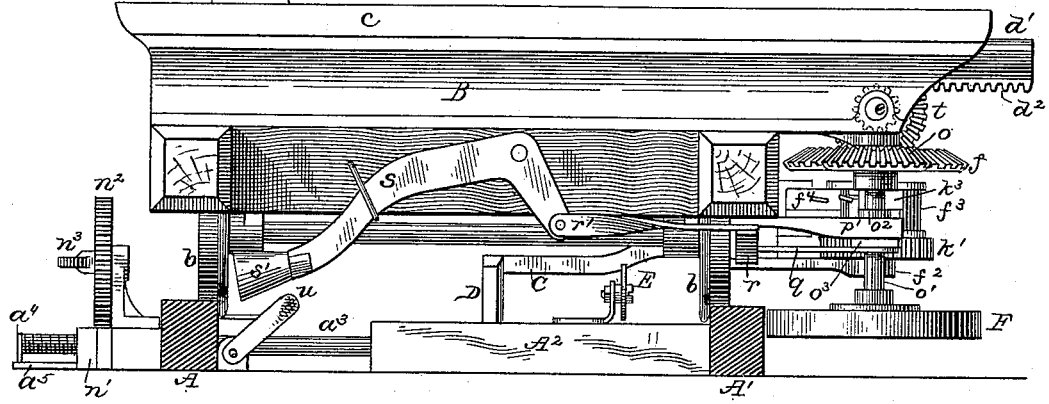
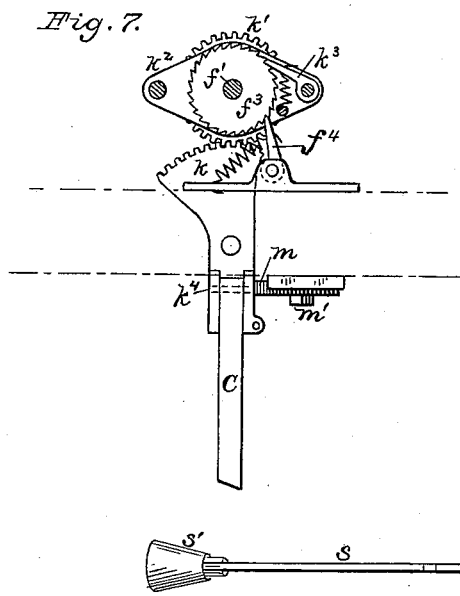
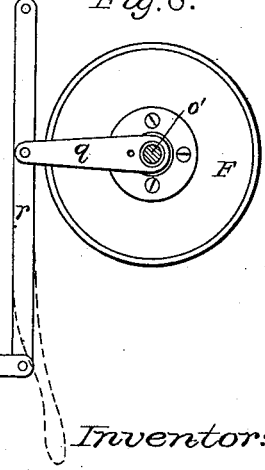
Attest:
Philip F. Larner
Howell Bartle
Inventor:
George Hanson,
Charles D. Clark.
By McNear attorney (No Model.) 5 Sheets—Sheet 4.
G. HANSON & C. D. CLARK.
SAW MILL SET WORKS.
No. 326,291. Patented Sept. 15, 1885.
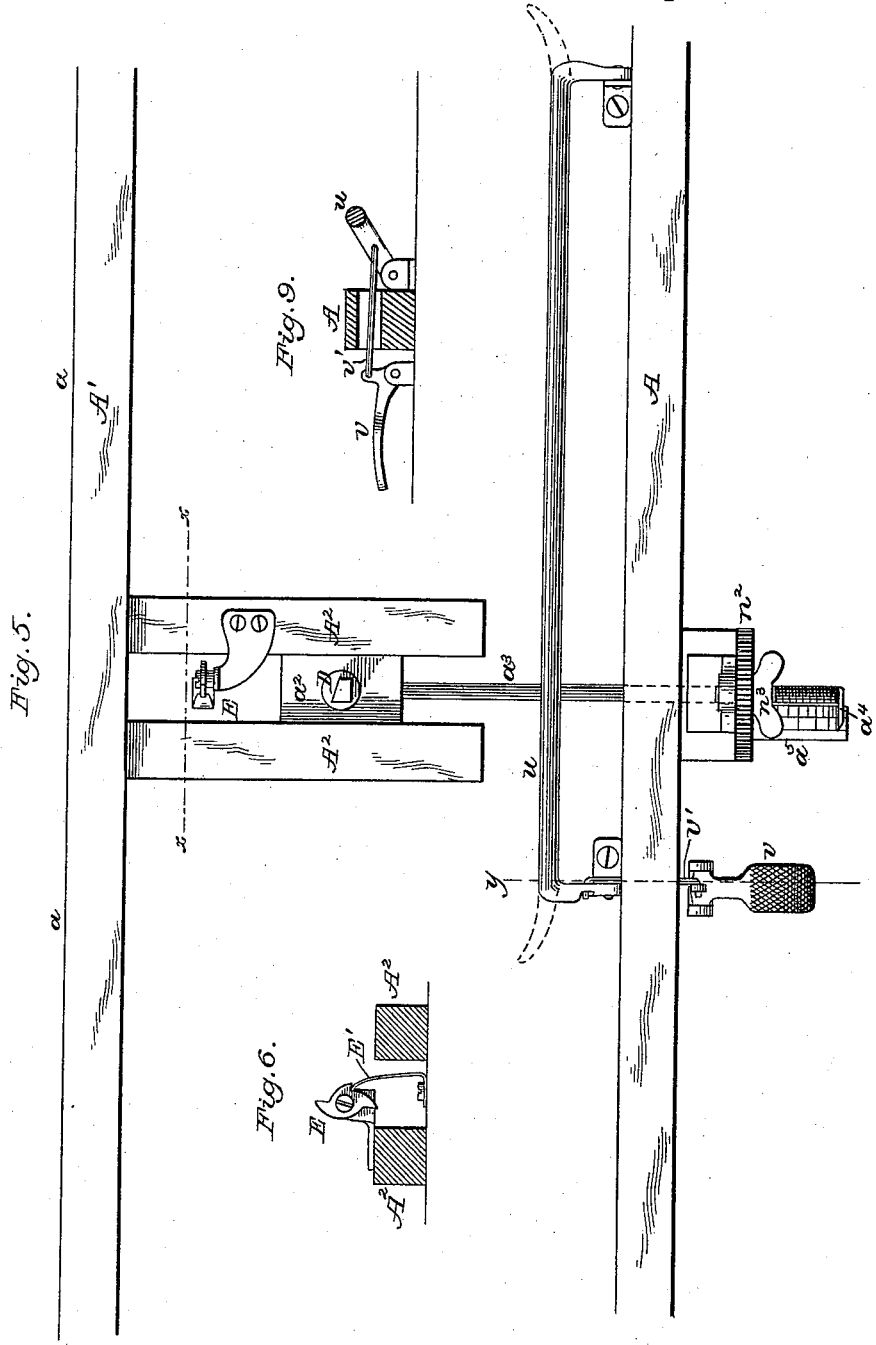

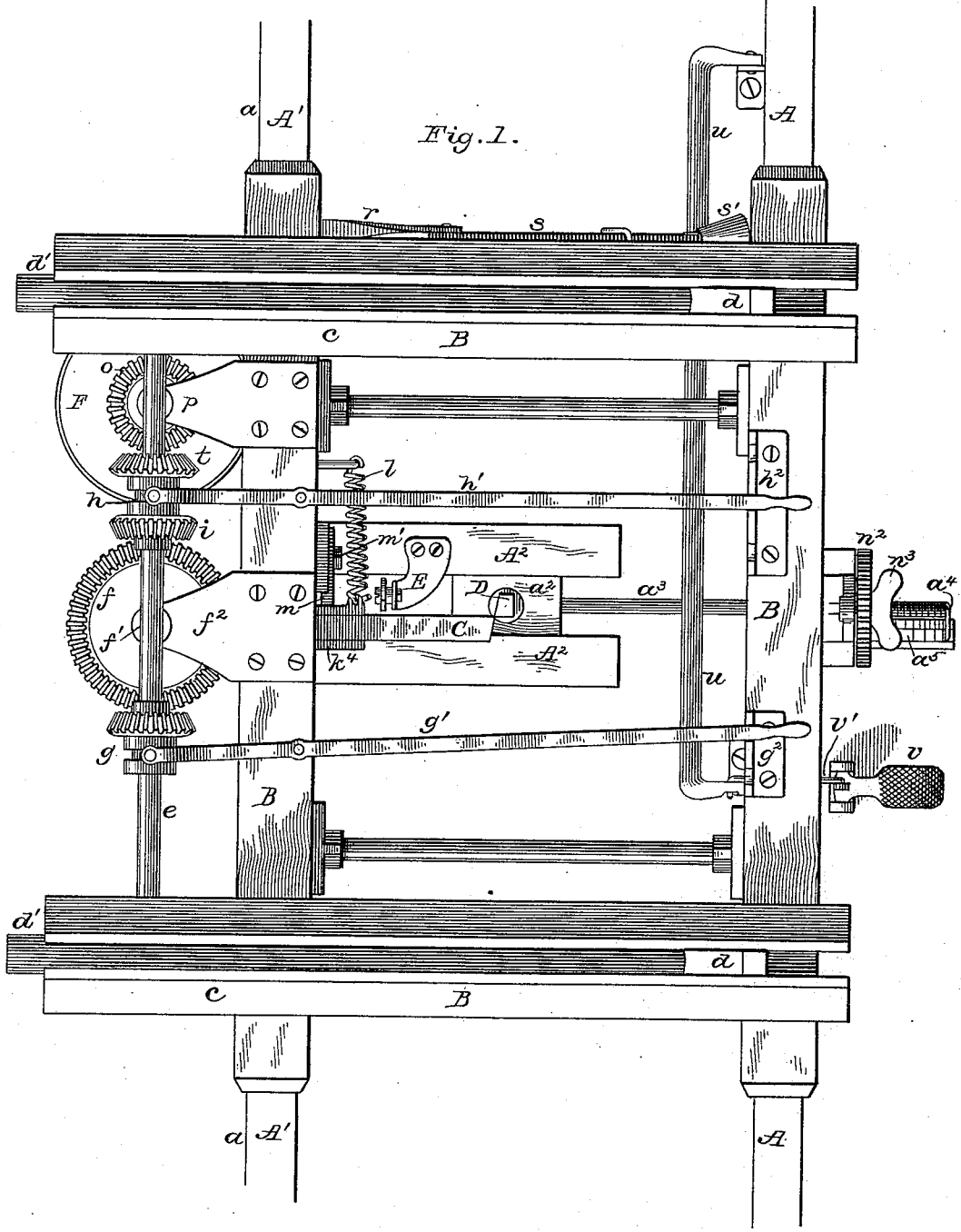

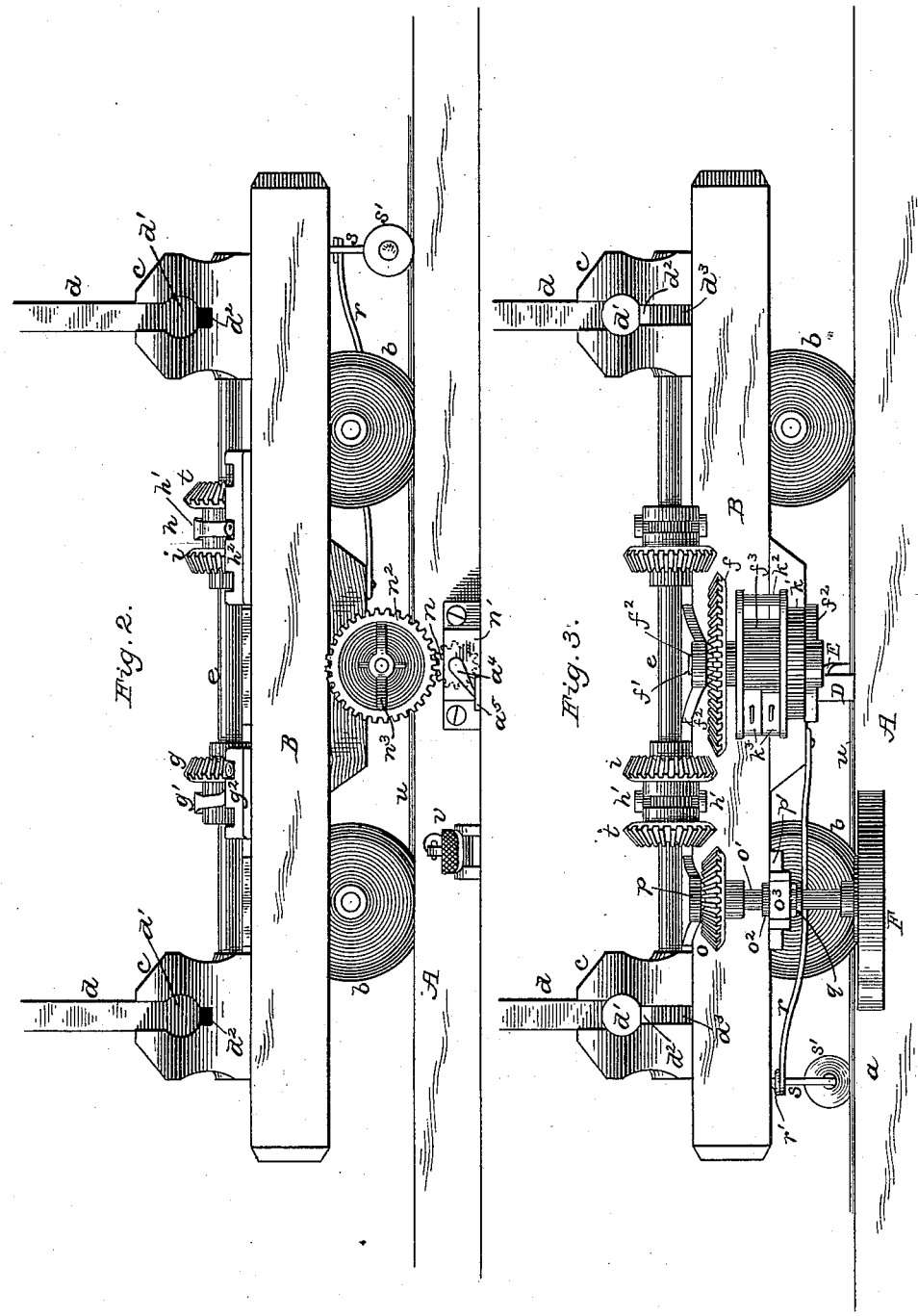

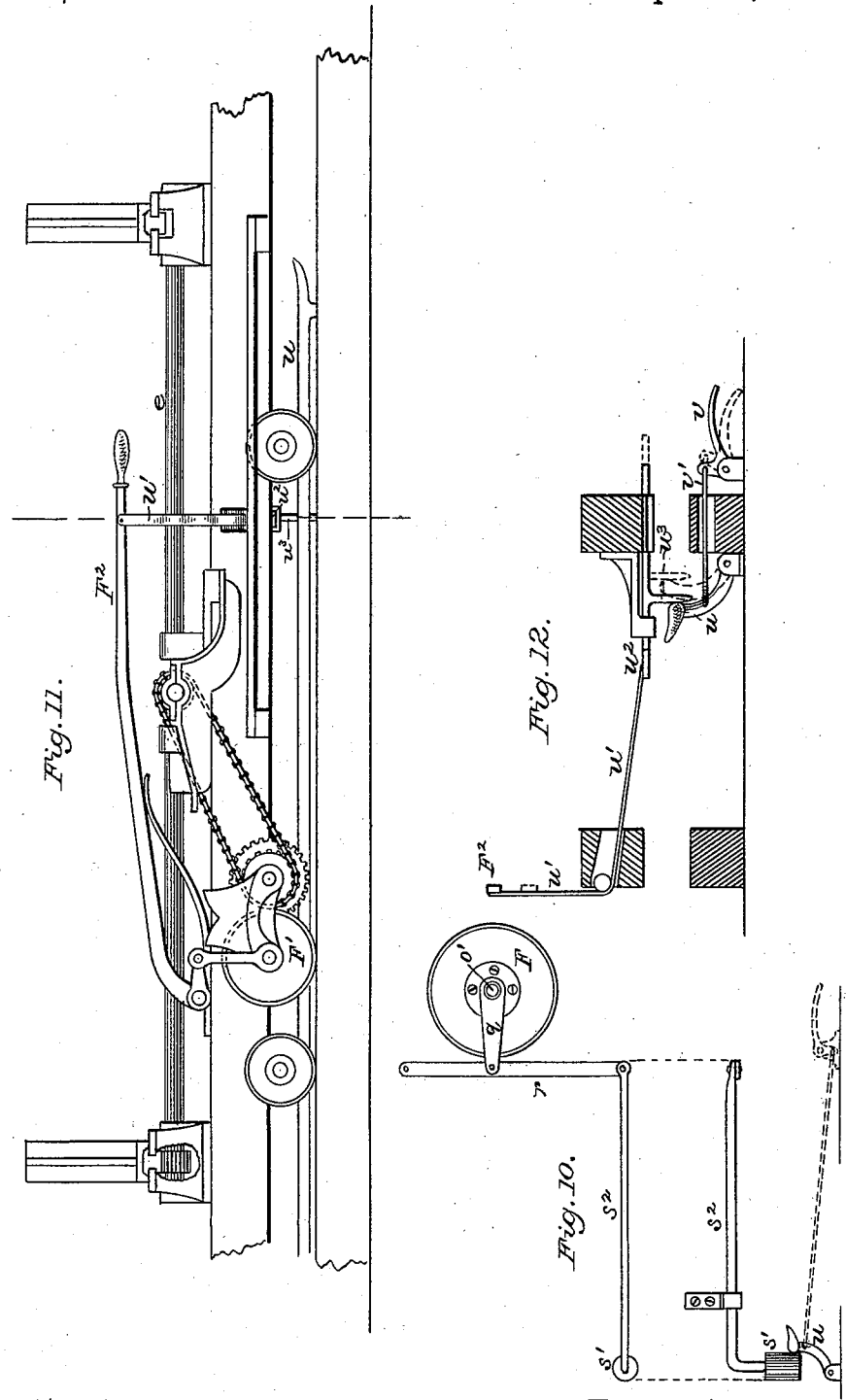

UNITED STATES PATENT OFFICE.

GEORGE HANSON AND CHARLES D. CLARK, OF MASSILLON, OHIO.

SAW-MILL SET-WORKS.

SPECIFICATION forming part of Letters Patent No. 326,291, dated September 15, 1885.

Application filed May 9, 1885. (No model.)

*To all whom it may concern:*

Be it known that we, GEORGE HANSON and CHARLES D. CLARK, both of Massillon, in the county of Stark and State of Ohio, have invented certain new and useful Improvements in Automatic Saw-Mill Set-Works; and we do hereby declare that the following specification, taken in connection with the drawings furnished and forming a part of the same, is a clear, true, and complete description of the several features of our invention.

A saw-mill embodying all of our improvements automatically advances the log-knees on the carriage toward the saw during the initial advance movement of the carriage, and also, when desired, said knees are automatically receded during any portion of the backward movement of the carriage. Broadly considered, these features in operation are old and well known; but we have devised and organized certain novelties in mechanism and combinations whereby the knee advancing and receding movements are conveniently and promptly controlled and varied and due provision made for securing accuracy in operation, notwithstanding the well-known liabilities of lost motion incident to the wear of active mechanism.

After fully describing the organizations illustrated in our drawings, the features deemed novel will be specified in the several clauses of claims hereunto annexed.

Inasmuch as our improvements relate solely to the carriage and its track and to the control of the log-knees it is not deemed necessary to illustrate the saw or the driving mechanism by which the carriage is driven to and fro, it being understood that our invention in no manner pertains thereto.

Figure 1 is a top or plan view of a portion of a track with a carriage and our improvements in their best form. Fig. 2 is a side elevation of the same as viewed from the saw side. Fig. 3 is a side elevation of the same as viewed from the side opposite to the saw. Fig. 4 is a front end view of the carriage. Fig. 5 is a plan view of the track with the carriage removed. Fig. 6 is a sectional view of Fig. 5 on line $x$, showing a spring tappet or latch. Fig. 7 illustrates the pawl-and-ratchet mechanism detached from the carriage. Fig. 8 illustrates the mechanism by which the knees are rapidly receded detached from the carriage. Fig. 9 is a sectional view through the inner track-rail on line $y$, Fig. 5. Fig. 10 illustrates a modification of a portion of the mechanism shown in Fig. 8. Figs. 11 and 12 illustrate in side view and partial cross-section a well-known saw-mill carriage, having a friction-wheel which engages with the tread of a track-rail, as heretofore, but having a portion of our improvements applied thereto.

The two track-rails A and A', Figs. 1 to 5, are as heretofore except that the rail A', at its outer side, $a$, must be sufficiently straight and smooth to serve as a bearing-surface for a friction-wheel as devised by us for receding the log-knees.

The carriage B has the usual flanged wheels, $b$, which have their treads upon the track-rails, near their inner sides, as heretofore.

Transversely on the carriage are guideways $c$, in which the log-knees $d$ and their tail-pieces $d'$ are mounted, and these latter have each a rack-gear, $d^2$, engaged, respectively, by pinions $d^3$ on a knee-shaft, $e$, mounted in bearings at the outer side of the carriage and longitudinal therewith, substantially as heretofore.

The shaft $e$ is organized by us with gearing, by which it may be intermittingly rotated in either direction, and thus cause corresponding advancing or receding movements of the knees.

A horizontal bevel-gear, $f$, is mounted on a vertical shaft, $f'$, at the outer side of and on the carriage below the shaft $e$, and supported by suitable brackets, $f^2$. A sliding or clutch gear, $g$, splined to the shaft $e$ and controlled by a lever, $g'$, enables said gear to be engaged by the driving-gear $f$, which can only be intermittingly revolved in one direction, and thus to intermittingly rotate the shaft $e$ and cause the knees to recede step by step. The lever $g'$ is provided at its outer end with a notched keeper, $g^2$, by which it can be securely held in either of its two positions of adjustment.

Another clutch, $h$, splined to the shaft $e$ and controlled by the lever $h'$, has a gear, $i$, which, by engagement with the opposite side of said intermittingly-rotated driving-gear $f$, causes the shaft $e$ to be correspondingly rotated and the knees to be advanced step by step. The lever $h'$ is also provided at its outer end with a notched keeper, $h^2$, by which it may be securely held in either of three positions of adjustment.

The intermittent rotation of the gear $f$ may be effected either by hand or automatically, as when operated as a result of the traveling movement of the carriage, or when both clutch-gears are disengaged the shaft $e$ may be continuously rotated in either direction by hand, if it be provided with a hand-crank, as in well-known or common non-automatic setworks.

The intermittent or step-by-step rotation of the gear $f$ and shaft $e$ is effected by means of the horizontal knee-setting lever C, projecting inwardly from the outer side of the carriage at its under side, whether said lever be vibrated by hand, as when the carriage is at rest, or automatically, as when the carriage is in motion. A lever, with ratchet and pawl below the carriage for operating each knee, has been heretofore employed; but we have not only provided for operating both knees by a single horizontal lever, but have also provided for the easy requisite movement of the knees by a minimum movement of said lever, and have organized therewith means for graduating the extent of vibration of said lever and the consequent extent of movement by the knees, and still further provided such means of adjustment as will secure accuracy in operation regardless of wear.

Heretofore a horizontal vibrating lever has been provided with pawls and pivoted directly to the shaft rotated by said lever during its movement in one direction, thus requiring a wide range of lever movement. We have provided our lever C with a quadrant-gear, $k$, which engages with a pinion, $k'$, attached to a pawl-frame, $k^2$, loosely mounted on the shaft $f'$ of the gear $f$, and provided with pawls $k^3$, which engage with the ratchet-wheel $f^3$, firmly keyed to said shaft and provided with stop-pawls $f^4$.

The knee-setting lever C is maintained in its forward or normal position by a retractile spring, $l$, and its said normal position can be varied by means of the adjustable stop-plate $m$, which is fitted to a slide on the carriage, and provided with an adjusting-screw, $m'$, by which said stop may be advanced or retired, and thus limit the action of the spring in pulling said lever forward.

As an important feature in construction, the lever C is pivotally connected to the quadrant-gear $k$ at $k^4$, so that said lever at its outer end may freely rise from and fall to a horizontal position, but be incapable of lateral vibration independently of the quadrant-gear. It will be obvious that this combination of knee-setting lever having a quadrant-gear with the pawl-frame, pinion, and gear $f$ is of value, regardless of the particular manner in which the knee-shaft is geared to the knees—as, for instance, whether by rack and pinion, as shown, or by beveled gearing, as when a rotative screw-shaft is tapped into the bases of the knees in a well-known and common manner.

We will now specially refer to Figs. 2 and 5, and explain the mechanism by which the knee-setting arm or lever C is variably vibrated.

Crosswise of the track-rails, and between them, at a proper distance from the saw, there are two guide-bars, $A^2$, between which is a sliding block, $a^2$, having thereon a vertical stud or stop, D, and said block, instead of being clamped by means of screws or bolts, as heretofore, has a screw-threaded tail-piece or adjusting-screw, $a^3$, which extends through the track-rail A, and has at its outer end a pointer, $a^4$, which overhangs a graduated gage-plate, $a^5$. On said threaded tail-piece is a gear-nut, $n$, loosely occupying a slot in a fixed plate, $n'$, and a toothed hand-wheel, $n^2$, provided with handles $n^3$, engages with said gear-nut, so that when the hand-wheel is rotated the gear-nut also rotates and causes the stop D to be advanced or retired, as the case may be, and its exact position to be indicated by the position of its pointer with relation to the graduations on the gage-plate. It will be obvious that by means of the adjustable stop-plate $m$ the position of the setting-arm C can be so varied as to enable the movements of the log-knees to exactly correspond with the graduations on the gage-plate, and should variations occur from lost motion incident to wear they can be readily corrected by adjusting said stop-plate.

At the outer side of or beyond the stop D there is a spring-tappet, E, pivotally mounted on a bracket, and having a curved face on one side and a vertical face on the other, as clearly shown in Fig. 6. The tappet E is merely one of many forms of spring-latch which can obviously be employed for this service; but I prefer the pivoted tappet and a spring, E', which maintains it in a normally-vertical position, permits it to tip freely backward, and serves as an abutment to prevent its movement in the opposite direction. Said spring-tappet is somewhat higher than the top of the stop D, so that when the carriage moves rearwardly the lever C on striking the curved face of the tappet will be caused to rise and ride freely over it, and consequently over the stop D; but when the carriage moves forward and the lever reaches and abuts against the tappet at its vertical face said tappet swings backward on its pivot and allows the lever to abut against said stop, and thereby causes said lever to operate the pawls and impart to the gear $f$ a rotative movement.

It is obvious that the extent of the advance movement of the knees will be proportionate to the extent of the vibratory movement of the lever C, and it is equally obvious that this last-named movement will be varied according to the advanced or retired position of the stop D with relation to the path of the knee-setting lever.

The wear of the lever and stop at their points of contact would obviously soon derange the accuracy of the knee movement, and this can be readily corrected by adjusting the stop-plate $m$ so as to change the normal position of the lever C, and it will be obvious that even if the stop D were not adjustable, the stop-plate $m$ could be relied upon for so varying the normal position of the lever C as to cause it to be variably vibrated and to consequently vary the extent of the movement of the knees. The labor involved in moving the knees and overcoming the friction of the intermediate gearing is obviously much more easily performed by the lever C, operating through its quadrant-gear and pinion than would be the case if the lever were directly pivoted on the shaft $f'$.

As thus far described it should be clear that if the clutch-gear $g$ be engaged with the gear $f$ the knees will be receded step by step, and that if the clutch-gear $i$ be engaged with said gear $f$ the knees will be advanced step by step in both cases during each initial forward movement of the carriage, and that the extent of the movement of the knees in either case will be dependent upon the relative adjustment of the lever C and stop D, and that the latter can be graduated by the pointer and gage-plate. It will also be obvious that the combination of the sliding stop D, its adjusting screw and gage, is applicable to any knee-setting lever, regardless of the manner in which said lever is geared or connected to the knees.

The adjusting-screw of the stop D is obviously a desirable means for sliding said stop to and fro and firmly holding it in all positions, and a worm-gear and worm-rack or a rack and pinion provided with pawls would serve a similar purpose, although neither arrangement would be more simple nor more effective than the nut-gear and screw-rod described.

We will next describe the means by which the knees are continuously retracted during a portion of the backward movement of the carriage.

As hereinbefore indicated, this has heretofore been done. We employ a friction-wheel in engagement with a rail as a motor for thus receding the knees, and, while this is not broadly new, we have for the first time so organized said wheel that it takes bearing against the side of a track-rail instead of upon its tread. It is obvious when the tread of a track-rail is engaged by a friction-wheel that the operation of the latter is liable to be more or less deranged by the presence of obstructive matter, such as sawdust or chips, resting on the rail, all of which we obviate by relying upon the side of the rail for contact with our friction-wheel when organized in its best form.

On the outer side of the carriage, beneath the shaft $e$, and in the same plane as the large bevel-gear $f$, a bevel-gear, $o$, is mounted on a swinging vertical shaft, $o'$, which at its top has a fixed bearing in a bracket, $p$. Below the gear $o$ said shaft is provided with a flange, $o^2$, resting on a box, $o^3$, which can slide laterally in a slotted bracket, $p'$. At the lower end of said shaft $o'$ there is a large horizontal friction-wheel, F, preferably having its periphery clad with rubber or other yielding material which will secure a good frictional engagement with the side of the track-rail A'. The forcing of the friction-wheel against its rail may be effected by means of a simple hand-lever, as illustrated in dotted lines in Fig. 8; but other more or less complex levers are of service when automatic operation is desired—as, for instance, a bell-crank lever and a straight lever coupled to operate as one lever.

The sliding box $o^3$, as here shown, is coupled by a link, $q$, to a horizontal lever, $r$, pivoted at one end to the under side of the carriage, and at the opposite or front end it is pivoted by a link, $r'$, to a bell-crank lever, $s$, so that by lifting the outer end of this bell-crank lever the friction-wheel will be forced against the side of the track-rail, and cause the latter to be firmly embraced between said friction-wheel and the flange of the adjacent carriage-wheel $b$, and thus when the carriage moves the friction-wheel and the gear $o$ are reliably rotated.

We have already referred to the clutch $h$ on the shaft $e$, and to the lever $h'$ by which the gear $i$ on said clutch is controlled in connection with the step-by-step movement. On said clutch $h$ there is a second bevel-gear, $t$, which, by being put into engagement with the gear $o$, couples the friction-wheel F with the knee-shaft $e$, and causes the rotation of the latter and the receding of the knees so long as the outer end of the bell-crank lever is maintained in an elevated position, and this latter can be done by the hand of a person while riding on or walking alongside of the carriage, although we have further provided for the complete control of said lever by the sawyer while standing in front of the saw and at the saw side of the carriage.

As clearly shown in Figs. 5 and 9, a long bar, $u$, having its ends bent roundly, but at right angles to its length, is pivoted at each end of the track-bed, so that said bar can be lifted and lowered. This bar may properly be termed a "cam-bar," because, when raised, it occupies the path of the outer end of the bell-crank lever $s$, which has a conical friction-roller, $s'$, thereon, and therefore said wheel rides upward over the bent or curved end of said bar as it would over a cam, and forces the friction-wheel F into operative engagement with the track-rail, and keeps it there either until the carriage has traveled the whole length of said cam-bar or released by the sawyer. When said bar is in its lower or normal position, the lever $s$ is not affected thereby. For lifting and holding this bar, a lever, $v$, is coupled thereto by a link, $v'$, and said lever may be operated either by the hand or foot of the sawyer while in position at the saw side of the track.

It is obvious that the swiveling or pivotal movement of the bar $u$ is merely incidental, inasmuch as the vertical movement of said bar in this case is all that is required, although the particular construction shown is a desirable one in view of the leverage exerted between the bell-crank lever $s$ and the operating-lever $v$.

It will be obvious that many of the advantages accruing from the use of the pendent friction-wheel on its swinging shaft do not depend upon any particular system or variety of leverage, even for securing an automatic operation—as, for instance, if the bar $u$, as indicated in dotted lines in Fig. 5, has at each end outwardly-curved extensions, and the swinging shaft $o'$ be provided with a sliding rod or link, $s^2$, extended across the carriage in suitable supports, and having a downwardly-bent end provided with a friction-roller, $s'$, as illustrated in Fig. 10, so that when the bar $u$ is raised, its curved ends will operate as cams in engaging with the roller $s'$, and cause the rod to be pulled endwise, and thereby place the friction-wheel F into working relation with the rail.

It will also be obvious that by uncoupling the knee-shaft from the gear $f$ and forcing the friction-wheel into operative relations with the rail and coupling its gear with the knee-shaft, the knees may, if desired, be rapidly advanced as well as retired, according to the direction in which the carriage is moved, although the receding movement of the knees is of course the most important in this connection.

Although for obtaining the most desirable results the cam-bar should be controllable at the saw side of the carriage, it is obvious that it may be controlled also at the opposite or outer side of the carriage by substantially duplicating the lever and link $v$ $v'$, as indicated in dotted lines in Fig. 10.

Heretofore friction-wheels engaging with the top of a track-rail have only been capable of being thrown in and out of gear by a person riding on or walking at the outer side of the carriage; and it will be obvious that our cam-bar $u$ can be profitably employed with said prior friction-wheels—as, for instance, in Figs. 11 and 12. We show a saw-mill carriage as heretofore constructed so far as relates to the knee-actuating shaft $e$, friction-wheel $F'$, and hand-lever $F^2$, these parts being so organized that when the lever $F^2$ is depressed the friction-wheel is forcibly engaged with the top of the track-rail and communicates its rotation by the gearing, the rag-wheel, and the chain, to the knee-shaft $e$. Now to this organization we apply our cam-bar $u$ as heretofore described, with its lever $v$, and enable it to control the hand-lever $F^2$ and friction-wheel $F'$ substantially as with our own friction-wheel by means of a belt or chain, $u'$, and a sliding bar, $u^2$, provided with a pendent stud, $u^3$, so that if the cam-bar $u$ be raised it will engage by the stud $u^3$, the slide-bar $u^2$ drawn inward, the lever $F^2$ forced downward, and the friction-wheel $F'$ thereby enabled to operate the knee-shaft $e$.

Many other equally obvious and desirable applications of portions of our invention to prior organizations could be illustrated, but it is not deemed necessary, because persons skilled in such matters will be readily able to make such uses of such portions of our invention as are not necessarily limited to a carriage and gearing precisely as preferred by us, although we think it advisable to employ all of our improvements in one machine.

With a saw-mill embodying all of our said improvements the sawyer, without substantially leaving his position at the front of the saw, can control the receding or the advancing of the knees step by step or render them immovable; or he can cause the knees to rapidly advance or recede through the operation of the cam-bar, and the variations in the position of the knees to provide for each desirable cut of a log can also be made with absolute precision.

Having thus described our invention, we claim as new, and desire to secure by Letters Patent—

1. The combination, substantially as hereinbefore described, with a saw-mill carriage having a rotative knee-shaft for simultaneously advancing the log-knees on said carriage, of pawl-and-ratchet mechanism geared to said knee-shaft and controlled by a horizontal knee-setting arm or lever below the carriage, and carried thereby, and a vertical stop or stud sliding crosswise in the path of the carriage, and provided with an adjusting-screw for moving said stop to and fro and confining it in position, whereby while the carriage is in motion the log-knees may be simultaneously advanced to a degree varied according to the particular adjustment of the stop with relation to the path of the knee-setting arm or lever as it is carried by the carriage.

2. The combination, with a saw-mill carriage and its knees, of a knee-shaft geared to said knees and provided with a clutch-gear, a knee-setting lever having a quadrant-gear thereon, a pawl-frame having a pinion engaging with said quadrant-gear, and a shaft having a fixed ratchet-wheel thereon surrounded by said pawl-frame, and a gear for engaging with the clutch-gear on the knee-shaft, substantially as described, whereby the knees will be moved step by step at each vibratory movement of the knee-setting lever.

3. The combination, with a saw-mill carriage and knee-shaft, of the gear $f$, its ratchet-wheels, pawls, pawl-frame, and pinion, and the knee-setting lever having a quadrant-gear engaging with said pinion, substantially as described.

4. The combination, with a saw-mill carriage, the knee-shaft, and its intermittent driving-gear rotatable in but one direction, of a pair of clutch-gears on said shaft at opposite sides of the driving-gear and separately engaging therewith, substantially as described, whereby said knee-shaft may be intermittingly rotated step by step in either direction, according to which of said clutch-gears is operatively connected with said driving-gear.

5. The combination, with a saw-mill carriage and its knee-shaft, and the driving-gear *f* and its ratchet mechanism, of the horizontal knee-setting lever free to rise at its outer end, the vertical spring-tappet, and a vertical stop for said lever in the path of the carriage, substantially as described, whereby said lever is free to abut against said stop and rotate the knee-shaft while the carriage moves forward, but is lifted by said tappet over said stop when the carriage moves backward.

6. The combination, with a saw-mill carriage, its knees and a knee-shaft controlled by a horizontal ratchet arm or lever, of the vertical stop sliding laterally in the path of the carriage, and provided with an adjusting-screw for moving said stop to and fro and confining it in position, and a gage, substantially as described, whereby on operating said screw said stop may be accurately moved and adjusted with relation to said lever for causing the knees to be advanced to certain predetermined positions.

7. The combination, with a saw-mill carriage having a knee-setting ratchet lever or arm, the knee-setting stop located in the path of the carriage, a spring for keeping the ratchet-arm in its normal position, and an adjustable stop on the carriage by which the position of the ratchet-arm can be varied, substantially as described, and for the purposes specified.

8. The combination, with a saw-mill carriage, its knees and knee-shaft, of a setting arm or lever geared to said shaft, the adjustable stop-plate on the carriage for varying the normal position of said arm or lever, and the adjustable sliding stop in the path of the carriage provided with a gage-plate, substantially as described, whereby the positions of the knees on the carriage may be always accurately indicated by the gage-plate.

9. The combination, with a saw-mill carriage and a track-rail, of a knee-actuating shaft, a friction-wheel adapted to be forced into contact with said rail, and gearing for coupling it to said shaft, and a cam-bar in the path of said carriage for forcing said friction-wheel into contact with its rail while the carriage is passing over said bar, substantially as described.

10. The combination, with a saw-mill carriage and one of its track-rails, of a knee-actuating shaft, a vertical swinging shaft on said carriage, having a gear at its upper end and a friction-wheel at its lower end, adapted to be forced and held into engagement with the side of said track-rail, and a gear on the knee-shaft for coupling it with the gear on the swinging shaft, substantially as described.

11. The combination, with a saw-mill carriage and one of its rails, of the friction-wheel and its pendent swinging shaft geared to the knee-shaft, the complex lever for swinging the friction-wheel shaft, and the cam-bar in the path of the carriage for engaging with the lever, substantially as described, and thereby forcing the friction-wheel to engage with the side of the track-rail, and to rotate the knee-shaft during the movement of the carriage over the bar.

GEORGE HANSON.
CHAS. D. CLARK.

Witnesses:
MURRAY FAWCETT,
JOE BARTLETT.